(12) United States Patent
Mattison

(10) Patent No.: US 7,870,865 B2
(45) Date of Patent: Jan. 18, 2011

(54) SAFETY PRESSURE RELIEF DEVICE

(75) Inventor: Mark Mattison, Alnwick (GB)

(73) Assignee: Elfab Limited, Tyne and Wear (GB)

( * ) Notice: Subject to any disclaimer, the term of this patent is extended or adjusted under 35 U.S.C. 154(b) by 640 days.

(21) Appl. No.: 11/685,862

(22) Filed: Mar. 14, 2007

(65) Prior Publication Data

US 2007/0215207 A1    Sep. 20, 2007

(30) Foreign Application Priority Data

Mar. 16, 2006    (GB) .................................. 0605372.2

(51) Int. Cl.
*F16K 17/16* (2006.01)
*F16K 17/40* (2006.01)

(52) U.S. Cl. ...................... 137/68.25; 137/68.27; 72/57

(58) Field of Classification Search .................. 137/67, 137/68.19, 68.27, 68.23, 68.25, 68.26, 68.24; 220/89.2; 72/57, 379.2
See application file for complete search history.

(56) References Cited

U.S. PATENT DOCUMENTS

| | | | | |
|---|---|---|---|---|
| 2,387,353 | A | | 10/1945 | Raymond |
| 2,523,068 | A | * | 9/1950 | Simpson et al. ............ 220/89.2 |
| 2,526,794 | A | * | 10/1950 | Andrews .................... 220/89.2 |
| 2,716,506 | A | * | 8/1955 | Fike ........................... 220/89.2 |
| 2,766,904 | A | * | 10/1956 | Bruce ........................ 220/89.2 |
| 3,072,288 | A | * | 1/1963 | Lemmer .................... 220/89.2 |
| 3,092,286 | A | * | 6/1963 | Duff ........................ 137/68.23 |
| 3,123,250 | A | | 3/1964 | Lemmer |
| 3,445,032 | A | * | 5/1969 | Hansen et al. ............. 220/89.2 |
| 3,463,351 | A | | 8/1969 | Mills |
| 3,467,120 | A | * | 9/1969 | Hill et al. ................. 137/68.25 |
| 3,704,807 | A | * | 12/1972 | Lidgard ..................... 220/89.2 |
| 3,921,556 | A | * | 11/1975 | Wood et al. ............. 29/890.141 |
| 4,072,160 | A | * | 2/1978 | Hansen ..................... 137/68.26 |
| 4,142,940 | A | * | 3/1979 | Modolell et al. ........... 220/89.2 |
| 4,436,218 | A | | 3/1984 | Beese |
| 4,819,823 | A | * | 4/1989 | Kadakia et al. ............ 220/89.2 |

(Continued)

FOREIGN PATENT DOCUMENTS

EP     0 395 318     4/1990

(Continued)

OTHER PUBLICATIONS

Extended European Search Report for European Patent Application No. 07 251 062.1, Jun. 25, 2007, European Patent Office, Munich, Germany.

*Primary Examiner*—John Rivell
(74) *Attorney, Agent, or Firm*—Stites & Harbison PLLC; Jeffrey A. Haeberlin

(57) ABSTRACT

A pressure relief bursting disc has a flange portion, a sloping portion interior of the flange portion and a dished portion interior of the sloping portion. The sloping portion has its wider end joined to the flange portion and slopes up from the flange portion in a first direction and is joined at its narrower end directly to the dished portion. The dished portion has its concave side facing in the first direction. In use pressure is applied to the concave side of the dished portion. The disc has a line of weakness, in the sloping portion. This shape achieves reliability of the burst strength, because the sloping portion buckles at the burst strength.

10 Claims, 4 Drawing Sheets

U.S. PATENT DOCUMENTS

Figure 1:
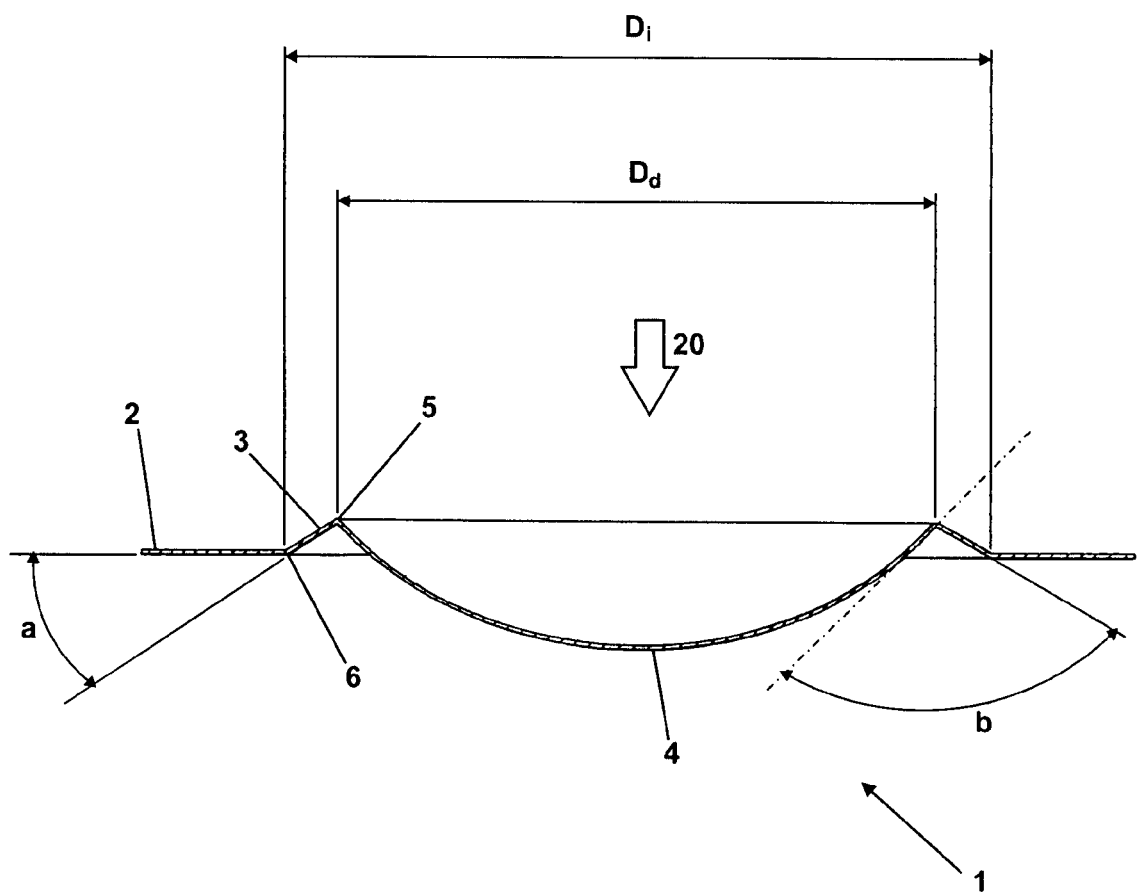

| | | | |
|---|---|---|---|
| 5,022,424 A * | 6/1991 | Reynolds et al. | 137/68.27 |
| 5,058,413 A | 10/1991 | Muddiman | |
| 5,755,249 A | 5/1998 | Muddiman | |
| 6,321,582 B1 * | 11/2001 | Cullinane et al. | 72/57 |
| 6,792,964 B2 * | 9/2004 | Farwell et al. | 137/68.25 |
| 7,234,481 B2 * | 6/2007 | Henderson et al. | 137/68.27 |
| 2005/0067010 A1 * | 3/2005 | Henderson et al. | 137/68.27 |
| 2006/0237457 A1 * | 10/2006 | Shaw et al. | 220/89.2 |

FOREIGN PATENT DOCUMENTS

| | | |
|---|---|---|
| GB | 1 004 199 | 7/1963 |
| GB | 2 285 284 | 11/1994 |
| WO | WO 2005/054731 | 6/2005 |

\* cited by examiner

SAFETY PRESSURE RELIEF DEVICE

TECHNICAL FIELD

The invention relates to safety pressure relief devices, and more particularly to bursting discs which are designed to rupture reliably at a predetermined pressure differential (burst strength). This invention also relates to an assembly comprising a bursting disc, and a method of manufacture of a bursting disc.

BACKGROUND OF THE INVENTION

It is well known in the chemical engineering and pharmaceutical industries to provide pressure relief devices for protecting pressure systems from over-pressurisation. One such pressure relief device is a bursting disc, for example as disclosed in WO 03/031853. When the pressure at one side of the disc rises above a predetermined burst strength, the disc ruptures thereby releasing pressure from the system. Typical applications are on reaction vessels and chambers, in the chemical, pharmaceutical and food industries.

It is also known in the art to provide a bursting disc with a rupture detector. WO 2005/054731 discloses a bursting disc type over-pressure detector having a bursting disc clamped at its flange between inlet and outlet pipe members. At the vent side of the device is mounted a magnet, its movement sensed by a non-invasive sensor. When the pressure at one side of the disc rises above a predetermined burst strength, the disc ruptures thereby releasing pressure from the system and moving the magnet relative to the sensor. A signal is produced by the sensor, signalling that the bursting disc has ruptured.

Bursting discs are usually classified into two types, forward acting discs and reverse acting discs. Forward acting discs have a domed shape with a concave side facing the high pressure. Reverse acting discs have a convex side facing the high pressure.

Forward acting discs are under tension in use, which gives them a tendency to stretch under pressure cycling and they are generally less durable and stable than reverse acting discs. For most applications, reverse acting discs are preferred. Reverse acting discs are in compression when under pressure and can operate closer to the burst strength during normal use and rupture more reliably than forward acting discs.

Bursting discs are often provided with a line of weakness (usually a score) which facilitates bursting as a disc begins to buckle at the predetermined burst strength. However, forming a score line in the domed part of a bursting disc can cause accidental damage, which reduces the reliability and durability of the disc. It is known in the art that these problems can be reduced by forming a score line in a frustoconical transitional portion between a domed portion and an annular flange, as disclosed in WO 03/031853.

It is difficult to produce a bursting disc that ruptures reliably at low pressures. A thin disc is fragile and difficult to handle. Materials that are malleable when thin are expensive and/or not easily available. Sometimes discs are scored or pre-damaged to give a lower burst strength, but this reduces the reliability and durability of the bursting disc. Additionally, pre-damaged discs tend to deform in a wave motion from one side to the other, when they buckle.

There is an additional problem in using reverse acting bursting discs at low pressures in that the disc must reverse through in order to burst. This reversal increases the volume of the system on the inlet side and may reduce the pressure of the system. Since the low pressure fluid cannot immediately fill the space behind the dome portion, the kinetic energy/momentum of the buckling dome portion is reduced and this can prevent the disc from bursting at the intended pressure. In an attempt to overcome this problem, one or more projections may be provided in the assembly on the vent side of the disc to facilitate tearing of the disc, as shown in EP 0395318.

SUMMARY OF THE INVENTION

The present invention has been devised to ameliorate or preferably overcome at least one of the aforementioned problems.

According to the present invention there is provided a pressure relief bursting disc having:
 a flange portion,
 a sloping portion interior of the flange portion, and
 a dished portion interior of the sloping portion,
 said sloping portion having its wider end joined to the flange portion and sloping up from the flange portion in a first direction and being joined at its narrower end directly to said dished portion, said dished portion having its concave side facing in said first direction. In operation the disc provides the desired burst strength when the concave face of the dished portion is facing the high pressure side.

The present invention provides a disc action that may be regarded as neither solely forward acting nor solely reverse acting. In use, the central dished portion is in tension (concave to the pressure) whilst the sloping portion is in compression (stands up towards the pressure).

The sloping portion, which is generally of annular shape and slopes in the first direction from its outer edge, may be curved as seen in axial cross-section but is preferably frustoconical. For ease of description it will below be referred to as the frustoconical portion.

Preferably, the dished portion has a strength that is higher, more preferably far higher, than the strength of the frustoconical portion. This means that it is the frustoconical portion that gives way (buckles) at the burst strength of the disc. This is desirable in the present invention because the frustoconical portion has been found to buckle more reliably than the dished portion. The inventors do not wish to be bound by theory but it is thought that this is because the frustoconical portion is in compression whereas the dished portion is in tension when the disc is in use. Having a dished portion with relatively high strength prevents the dished portion from stretching during pressure cycling and therefore increases the durability of the disc. Additionally, if the dished portion is damaged during handling, the performance of the disc may be unaffected.

The shape of the dished portion is not particularly limited, especially since it preferably has higher strength against the applied pressure than the frustoconical portion and is therefore not liable to buckle or burst at pressures close to the burst strength. However, the dished portion is preferably domed, having, for example, a spherical, catenary, elliptical or parabolic curvature. However, the dished portion may have any suitable concave shape, for example it may have an outer frustoconical portion joined at its interior edge to a dome portion or it may comprise a flat base.

Generally, the frustoconical portion and the dished portion are circular, the disc having an axis of symmetry.

The flange portion is preferably planar, or has its interior edge lying in a plane. Usually the flange portion is annular.

The depth of the dished portion is not particularly limited, but it preferably extends through the plane of the flange portion. The depth of the dished portion can be adjusted to alter the burst strength of the disc. In some embodiments, a deeper dished portion leads to a higher burst strength. It has been found that the connection between the frustoconical portion and the dished portion is an important factor in determining the performance and burst strength of the disc. This connection is preferably curved. It has been found that decreasing the radius of curvature of this connection results in a more instantaneous reversal of the frustoconical portion, rather than a gradual or 'rolling' reversal, at burst strength. The failure of the disc is therefore relatively sudden, which is desirable. The radius of curvature (on the inside of the curve) is preferably not more than 2.0 mm, more preferably not more than 1.0 mm. This radius of curvature is preferably at least 0.2 mm, more preferably 0.5 mm, with a view to avoiding damage to the material and reducing cost of tooling.

The angle between the frustoconical portion and the tangent to the dished portion at their connection, as seen in their axial cross-section, has also been found to affect the performance and burst strength of the disc and is preferably in the range 60° to 150°, more preferably 95° to 120°. Reducing this angle increases the burst strength, in some constructions.

The frustoconical portion and the flange portion may be joined indirectly (e.g. by a second frustoconical portion) but are preferably directly joined. A direct connection between the frustoconical portion and the flange portion may be curved or may be a sharp edge (this can be adjusted by tooling). The radius of curvature of this connection has been found to affect the performance and burst strength of the disc and is preferably in the range 0 (approximately a sharp edge) to 2 mm, more preferably 0 to 0.5 mm. A small radius of curvature helps to maintain the strength of the structure and avoid a gradual failure at burst strength.

The burst strength and performance of the disc can be adjusted by altering the acute angle between the frustoconical portion and the plane of the flange portion. Increasing this angle has been found to increases the burst strength of the disc. This is thought to be because, although the compressive forces on the frustoconical portion increase, the resultant turning moment about the connection of the frustoconical portion to the flange is reduced. This angle is preferably in the range 20° to 45°, more preferably 25° to 40°.

The primary mode of failure of the disc is for the disc to buckle at the predetermined burst strength. The secondary mode of failure is for the disc to rupture, following the initial buckling. The disc preferably comprises one or more lines of weakness to cause a controlled rupturing of the bursting disc as the disc buckles. Each of these lines of weakness may conveniently be a score line, preferably on the vent side of the disc. A line or lines of weakness are preferably formed in the frustoconical portion of the disc since this is where rupture is most desirable.

The ratio (as a percentage) of the diameter of the dished portion to the outer diameter of the frustoconical portion is preferably less than 95%, more preferably less than 90%, in order that there is enough space for a line of weakness to be formed on the frustoconical portion.

This ratio is preferably more than 50%, more preferably more than 70%, in order to limit the amount of material in the frustoconical portion so that the risk of twists and kinks can be avoided.

The diameter of the dished portion is not particularly limited, being determined by the size of the pipe in which the disc is to be fitted, though may be in the range 20 to 260 mm for most uses.

Likewise, the outer diameter of the frustoconical portion is not particularly limited though may be in the range 25 to 300 mm for most uses.

The thickness of the material of the disc is not particularly limited but may be in the range 0.05 to 0.25 mm for typical uses, more preferably 0.05 to 0.20 mm.

The burst strength range of the disc depends on the diameter of the dished portion and frustoconical portion but may typically be in the range 14 kPa (0.14 barg, 2 psig) to 690 kPa (6.9 barg, 100 psig).

The material used for the disc is not particularly limited and may be any that are used in the art. Metal is preferred. Particularly suitable materials have been found to be Hastelloy (Trade Mark) and stainless steel.

A bursting disc according to the present invention is found to be durable under pressure cycling (embodiments have been found to last 100,000 or more pressure cycles) and to rupture reliably at predetermined pressure differentials. The inventor does not wish to be bound by theory, but it is thought that the durability and reliability of discs according to the present invention comes from the frustoconical portion not being in tension when the bursting disc is in use.

A bursting disc according to the present invention has been found to collapse quickly and centrally when it reaches its predetermined burst strength. That is, the disc overcomes the resistance to collapse sharply, and collapse is not in a wave motion from one side to the other due to the axial symmetry of the disc.

The inventor has also found that a bursting disc according to the present invention is particularly suited to discs with low burst strength. Discs according to the present invention can be made to burst reliably at low pressure differentials, whilst avoiding the use of very thin metal for the disc. A thicker disc material is also preferable since handling, tooling or scoring the disc is less likely to result in damage of the disc and reduction of its performance. The present invention may also avoid the use of materials that are malleable when very thin, which can be expensive and/or difficult to obtain.

As the bursting disc collapses there is little change in the volume of the system compared with known reverse acting bursting discs since only the frustoconical portion reverses during collapse. This means that pressure is maintained on the disc as it buckles which improves the performance of the disc, especially in applications where the pressurised medium is low pressure gas or is a liquid.

The bursting disc assembly of the invention is preferably installed in a suitable bursting disc holder between pipe flanges in a conventional manner.

In another aspect, the invention consists in an assembly including the bursting disc of the invention described above. This assembly may include other components, such as those that are known in the art. For example, an assembly may comprise one or more projections on the vent side of the disc, such as a tooth or teeth which are encountered by the disc on buckling and cause rupture, e.g. at the score line. For example, projections such as these are disclosed in EP 0 395 318. An assembly according to the present invention may comprise a magnet based movement sensor (e.g. as disclosed in WO 2005/054731) or may comprise back pressure support (e.g. as disclosed in GB 2285284). The assembly may also comprise a rupture chamber and the like.

Another aspect of the present invention is a method of making a bursting disc, comprising the steps of:

forming a sheet into a mould producing an article having a flange area, a central portion and a sloping portion which stands up in a first direction from the flange area, and clamping at least the sloping portion and by means of pressurised fluid forming the central portion into a dished shape, having a concave side facing in said first direction.

Preferably the frustoconical portion is formed by means of pressurised rubber, for good process control and ease of operation. Preferably, the dish shaped portion is a dome formed by means of gas or liquid to maintain the integrity of the dome and permit precise selection of the desired burst strength.

Preferably a score is formed on the concave side of the frustoconical portion. This score is preferably formed before the forming of the central dished portion, so that the product is completely finished apart from the forming of the dished portion and can be stored as an intermediate product. The dished portion may then be formed to give a specific burst strength according to a customer's requirement.

DRAWINGS

Further explanation of the invention, and embodiments of it, will now be described by way of non-limiting examples, with reference to the following drawings, in which:

FIG. 1 is a sectional view of a bursting disc embodying the invention.

Figure 2A:
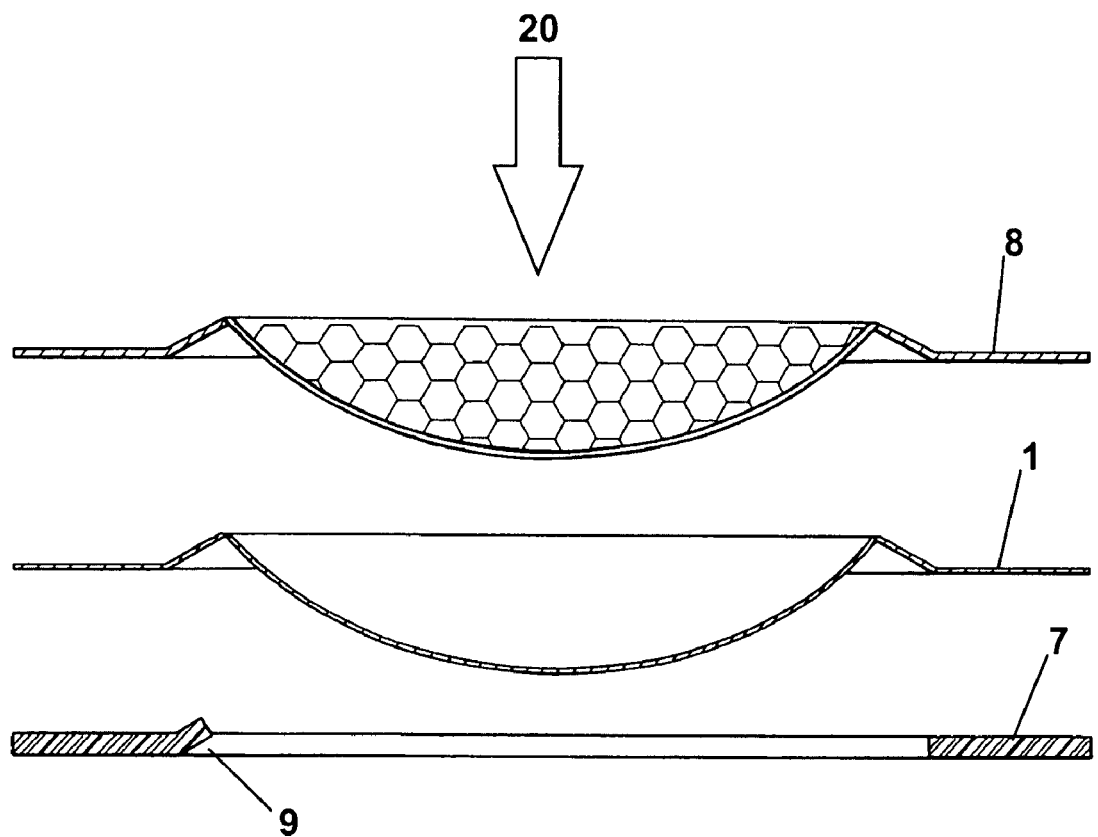
Figure 2B:
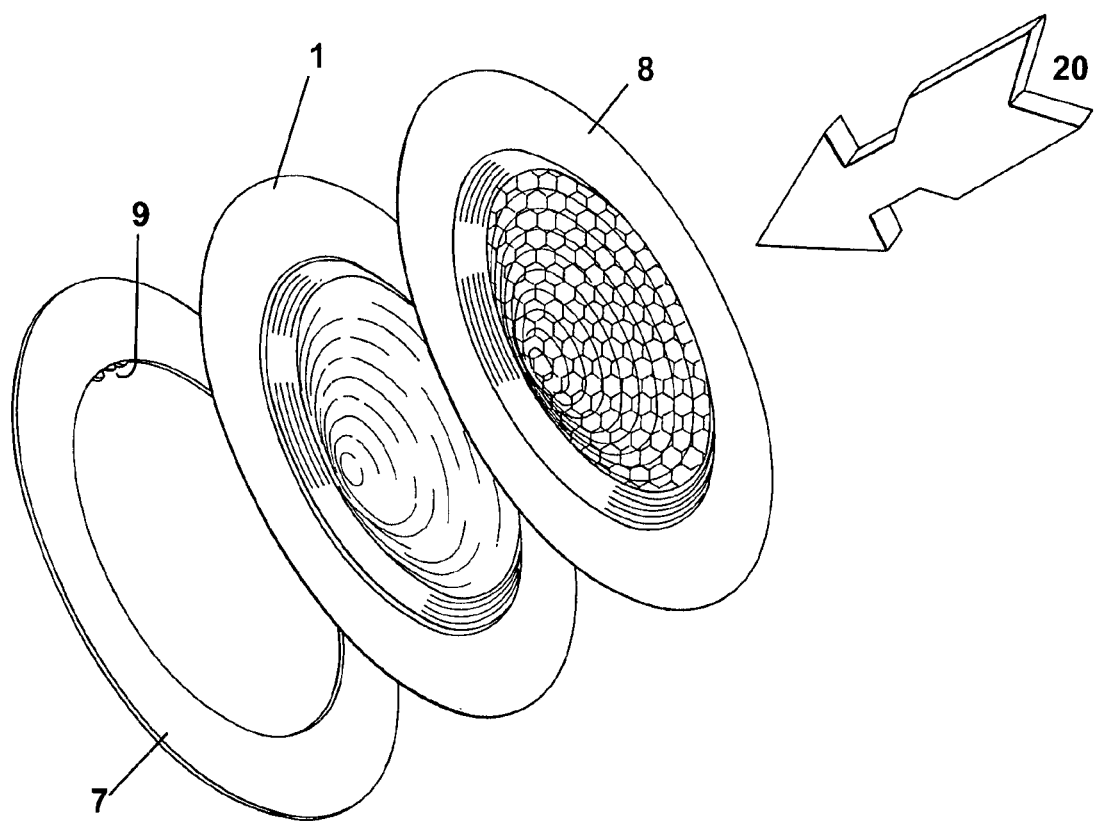
Figure 3A:
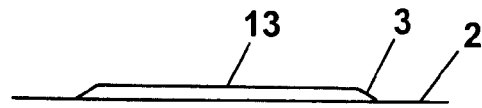
Figure 3B:
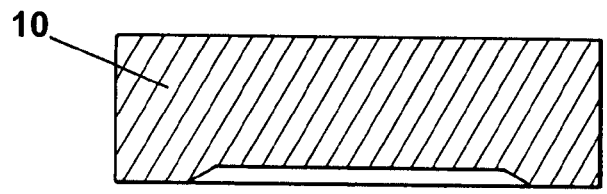
Figure 3C:
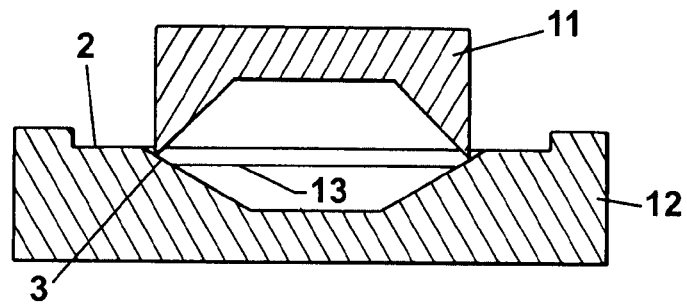
Figure 3D:
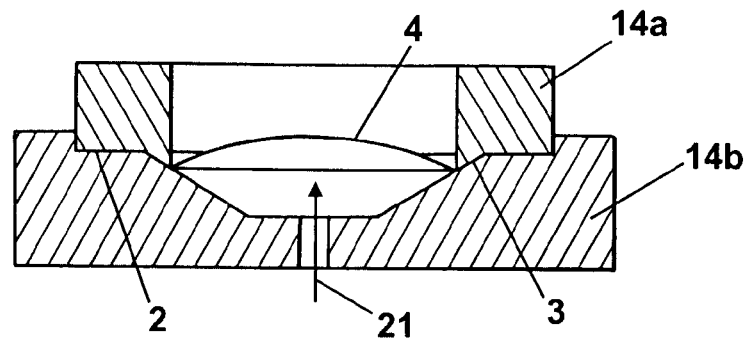

FIGS. 2(a) and 2(b) show in exploded sectional and perspective views an assembly including the disc of FIG. 1.

FIGS. 3a to 3d show a method for making a bursting disc according to the present invention.

DESCRIPTION WITH REFERENCE TO THE DRAWINGS

An embodiment of a bursting disc according to the present invention will now be described, with reference to FIGS. 1, 2(a) and 2(b).

The disc 1 is formed in one-piece of metal and comprises a planar annular flange portion 2, a domed central portion 4 and an intermediate frustoconical portion 3 which interconnects the flange and domed portions. The intermediate frustoconical portion 3 stands up from the flange 2 towards the applied pressure 20 in the use of the disc, whereas the domed portion 4 is concave relative to the pressure 20. The frustoconical portion 3 forms an acute angle a to the plane of the annular flange portion at their connection 6. An angle b is formed between the frustoconical portion 3 and the tangent to the dished portion at their connection 5. The connection 5 is curved, with a radius of curvature of 0.5 mm. The connection 6 is also curved, with a radius of curvature of approximately 0 mm.

The domed portion 4 extends through the plane of the flange portion 2. The domed portion 4 has a strength that is much higher than that of the frustoconical portion 3. This results in the burst strength of the disc being mostly dependent on the strength and structure of the frustoconical portion 3 rather than the domed portion 4, which has been found to improve the reliability and durability of the bursting disc. Additionally, minor damage to the domed portion of the disc during handling/scoring is less likely to affect the performance of the disc.

The frustoconical portion 3 comprises an incomplete circular score (not shown) on the vent side of the disc. Other shapes of score line are possible. As the disc buckles at the predetermined burst strength, the score line helps to achieve a controlled rupturing of the disc.

In this particular embodiment, the disc is made out of Hastelloy (Trade Mark). The diameter of the domed portion 4 is 47 mm. The outer diameter of the frustoconical portion 3 is 55.75 mm. The percentage ratio of the diameter of the domed portion 4 to the outer diameter of the frustoconical portion 3 is 84.3%. The depth of the domed portion is 9.6 mm. The burst strength of this disc has been found to be about 57 kPa (0.57 barg, 8.5 psig) when the thickness of the metal is 0.0635 mm (0.0025 inches).

The bursting disc 1 shown in FIGS. 2(a) and 2(b) is identical to that shown in FIG. 1 and is mounted in an assembly which additionally comprises a support ring 7 and back pressure support 8. The support ring 7 is fitted to the vent side of the bursting disc 1 to support the annular flange portion 2. Projections 9 in the form of teeth are provided on the support ring and these cause the disc to rupture at the score line, by contacting the disc as it buckles. On the upstream (pressure) side of the bursting disc 1 is fitted a back pressure support such as the one disclosed, for example, in GB 2285284. This support prevents the disc from collapsing in the event that a reverse pressure differential (in the opposite direction to pressure 20) occurs.

FIG. 3 shows one method of producing a bursting disc according to the present invention. A flat metal sheet is cropped and formed by means of pressurised rubber into a fixed mould 10 shown in FIG. 3(b) in which the sheet is not shown, producing the annular flange area 2, the frustoconical portion 3 making an acute angle to the annular flange portion 2, and a flat central portion 13 as shown in FIG. 3(a). At this stage, an optional score line can be applied to the concave side of the frustoconical portion 3 by means of blade 11 as shown in FIG. 3(c) acting against a support 12. Applying a score at this stage helps avoid damage to the dome to be formed later from the central portion 13. The frustoconical portion 3 is then clamped between annular clamp bodies 14a, 14b shown in FIG. 3(d) and the inverted domed portion 4 is produced by applying gas or liquid pressure as indicated by arrow 21. The level of pressure applied determines the depth of the domed portion 4, and this depth determines the burst strength of the disc. This also determines the angle between the frustoconical portion 3 and the domed portion 4. The small radius of curvature of this transition is determined by the shape of the corresponding edge of the upper clamp body 14a.

The invention claimed is:

1. A pressure relief bursting disc which is adapted to rupture at a predetermined pressure differential, having:
   a flange portion lying in a plane,
   a frustoconical sloping portion interior of the flange portion, and
   a dished portion interior of the sloping portion,
   said sloping portion having its wider end joined to the flange portion and sloping up from the flange portion in a first direction which, in use, is toward an applied pressure which causes said disc to rupture at said pressure differential and being joined at its narrower end directly to said dished portion, said dished portion having its concave side facing in said first direction, and the disc having a line of weakness,
   the disc having a first side facing in said first direction and an opposite side to said first side,
   said line of weakness being in said sloping portion,
   said sloping portion and said plane of the flange portion are at an acute angle in the range 20° to 45° to each other as seen in axial section of the disc, and
   at said opposite side of the disc, said sloping portion and a tangent to said dished portion at their connection are at an angle in the range 60° to 150° to each other as seen in axial section of the disc.

2. A bursting disc according to claim 1, wherein said dished portion is curved, as seen in cross-section, over its whole extent between its junctions to the sloping portion at opposite sides.

3. A bursting disc according to claim 1, wherein the connection between the sloping portion (3) and the dished portion is curved, as seen in cross-section.

4. A bursting disc according to claim 3, wherein said connection between the sloping portion and the dished portion has a radius of curvature of at least 0.2 mm, as seen in cross-section.

5. A bursting disc according to claim 3, wherein said connection between the sloping portion and the dished portion has a radius of curvature of not more than 2.0 mm, as seen in cross-section.

6. A bursting disc according to claim 1, wherein said angle between the sloping portion and the tangent to the dished portion at their connection is in the range 95 to 120°.

7. A bursting disc according to claim 1, wherein said dished portion extends through the plane of said flange portion.

8. A bursting disc according to claim 1, wherein said line of weakness is a score.

9. A pressure relief assembly comprising a pressure relief bursting disc which is adapted to rupture at a predetermined pressure differential, said disc having a flange portion lying in a plane, a frustoconical sloping portion interior of the flange portion, and a dished portion interior of the sloping portion, said sloping portion having its wider end joined to the flange portion and sloping up from the flange portion in a first direction which is toward the applied pressure which is liable to cause said disc to rupture at said applied pressure differential and being joined at its narrower end directly to said dished portion, said dished portion having its concave side facing in said first direction, and the disc having a line of weakness, the disc having a first side facing in said first direction and an opposite side to said first side, said line of weakness being in said sloping portion, wherein said sloping portion and said plane of the flange portion are at an acute angle in the range 20° to 45° to each other as seen in axial section of the disc, and at said opposite side of the disc said sloping portion and the tangent to said dished portion at their connection are at an angle in the range 60° to 150° to each other as seen in axial section of the disc, wherein the concave face of said dished portion faces a high pressure side of the assembly and said sloping portion is arranged to buckle at the burst strength of the disc.

10. A method of making a pressure relief bursting disc which is adapted to rupture at a predetermined pressure differential, having a flange portion lying in a plane, a frustoconical sloping portion interior of the flange portion, and a dished portion interior of the sloping portion, said sloping portion having its wider end joined to the flange portion and sloping up from the flange portion in a first direction which, in use, is toward the applied pressure which causes said disc to rupture at said applied pressure differential and being joined at its narrower end directly to said dished portion, said dished portion having its concave side facing in said first direction, and the disc having a line of weakness, the disc having a first side facing in said first direction and an opposite side to said first side, said line of weakness being in said sloping portion, wherein said sloping portion and said plane of the flange portion are at an acute angle in the range 20° to 45° to each other as seen in axial section of the disc, and at said opposite side of the disc said sloping portion and the tangent to said dished portion at their connection are at an angle in the range 60° to 150° to each other as seen in axial section of the disc, the method including the steps of:

forming a sheet into a mould thereby producing an article having said flange area, a central portion and said sloping portion which stands up in a first axial direction from said flange area, and clamping at least said sloping portion and by means of pressurized fluid forming said central portion into said dished portion which has a concave side facing in said first axial direction, the method further including the step of forming said line of weakness in said sloping portion.

* * * * *